United States Patent [19]

Sato

[11] 4,288,826

[45] Sep. 8, 1981

[54] PAD DEVICE FOR USE IN TAPE CASSETTE

[75] Inventor: Masaaki Sato, Hachioji, Japan

[73] Assignee: Olympus Optical Company Limited, Tokyo, Japan

[21] Appl. No.: 87,963

[22] Filed: Oct. 25, 1979

[30] Foreign Application Priority Data

Oct. 27, 1978 [JP] Japan .......................... 53-148082[U]

[51] Int. Cl.³ ...................... G11B 15/60; G11B 23/04
[52] U.S. Cl. .............................. 360/130.33; 242/199; 360/132
[58] Field of Search .................... 360/130.33, 130.32, 360/130.31, 132, 96; 242/55, 19 A, 197–200

[56] References Cited

U.S. PATENT DOCUMENTS

| 3,126,163 | 3/1964 | Knox | 360/130.33 |
| 4,011,592 | 3/1977 | Kawada | 360/132 |
| 4,011,593 | 3/1977 | Gaiser et al. | 360/132 |
| 4,087,845 | 5/1978 | Saito | 360/130.33 |
| 4,096,538 | 6/1978 | Oishi | 360/132 |
| 4,131,243 | 12/1978 | Machida | 360/132 |

Primary Examiner—Alfred H. Eddleman

[57] ABSTRACT

A pad device for use in a tape cassette is disclosed. The pad device comprises a support member of substantially H-shape in cross section provided near a capstan shaft hole, spring members fixed to the support member, at its one end portions, respectively, and pad members adhered to the spring members at its free end portions, respectively.

5 Claims, 7 Drawing Figures

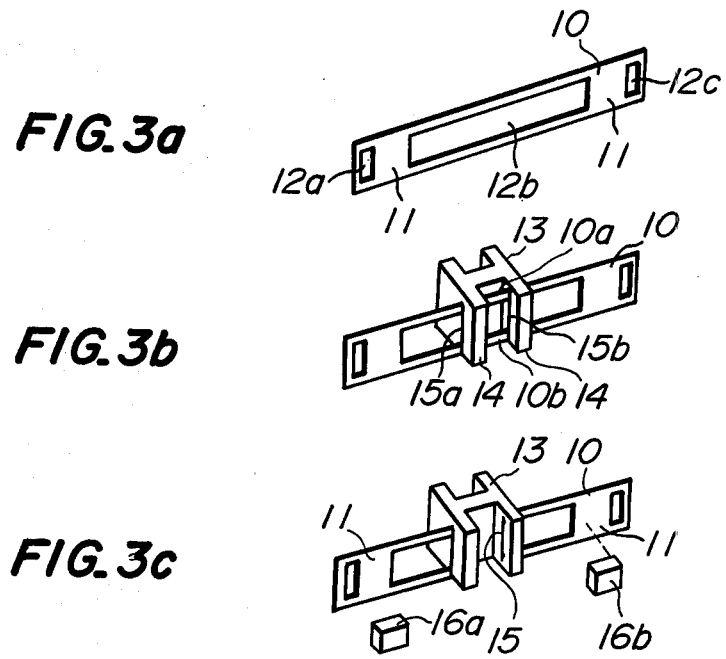
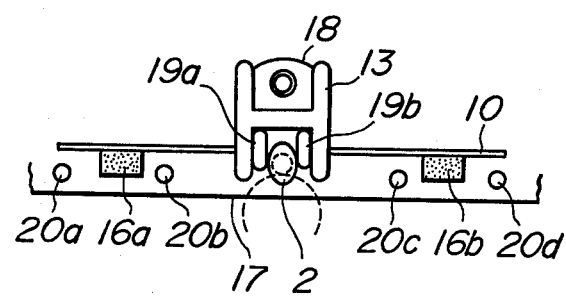
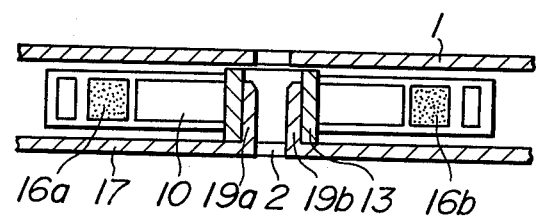

PAD DEVICE FOR USE IN TAPE CASSETTE

BACKGROUND OF THE INVENTION

The present invention relates to a pad device for use in a tape cassette which is easy to handle, assemble and operate.

A microcassette (trade name) 1, resently developed by the present applicant and in wide use, is provided with a capstan shaft inserting hole 2 at its center and magnetic head inserting windows 3a, 3b on both sides thereof as shown in FIGS. 1 and 2. Pads 5a, 5b adhered to a leaf spring 4 formed by bending a metal plate are arranged at predetermined positions of the magnetic head inserting windows 3a, 3b. In this case a single leaf spring is bent and worked so as to extend around the capstan inserting hole, so that pad pressure is liable to change due to error in this bending angle and thus, recording and reproducing performance may be impaired. Particuarly, the thickness of the leaf spring is not uniform, so that in addition to a change of the pad pressure due to the uneven plate thickness, the bending angle may be changed and bending precision is also impaired.

Such change of the pad pressure occurs by the change of the bending angle not only during operation but also during adhering of the pads or in transportation.

When automatically assembling a cassette, a spring formed with bends is difficult to mount to the cassette and the bending angle thereof deviates it to the cassette because of the construction of a cassette half.

SUMMARY OF THE INVENTION

An object of the present invention is to eliminate the above described disadvantages of the conventional pad device.

Another object of the present invention is to provide a pad device for use in a tape cassette which does not require bending which operates with improved precision and which may be easily assembled at low cost.

According to the present invention a pad device is provided for use in a tape cassette having a cassette casing, a capstan shaft hole provided in the casing and magnetic head inserting windows provided in the casing at least on both sides of the capstan shaft hole, the pad device comprising a support member of substantially H-shape cross section provided near the capstan shaft hole, spring members fixed to the support member, at its end portions, respectively, and pad members adhered to the spring members at free end portions, respectively. The spring members fixed to the support member have the same length.

BRIEF DESCRIPTION OF THE DRAWING

FIGS. 3a, 3b and 3c are perspective views showing one embodiment of a pad device according to the present invention;

FIG. 4 is a plan view showing the state of mounting the pad device according to the present invention to a tape cassette casing; and FIG. 5 is a sectional side view of the pad device shown in FIG. 4.

DESCRIPTION OF THE PREFERRED EMBODIMENT

Figure 1:
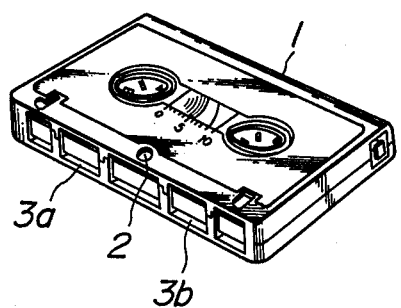
FIG. 1 is a perspective view of a tape cassette for explaining the present invention.
Figure 2:
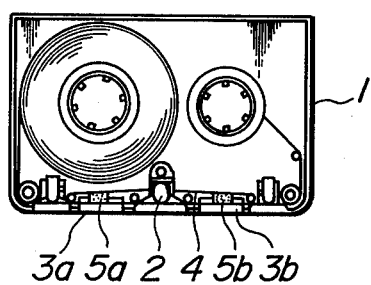
FIG. 2 is a plan view showing a conventional pad device mounted to the tape cassette half.

Referring now to FIGS. 3a to 3c, one embodiment of a pad device for use in a tape cassette according to the present invention will be described.

As shown in FIG. 3, a flat leaf spring member 10 of the same quality as a conventional one is provided with hollow portions 12a, 12b and 12c made by punching with a pad adhering portion 11 being retained at both ends.

On the other hand, a holder or a supporting member 13 for fixing the above leaf spring 10 within a tape cassette 1 is made of synthetic resin or the like with an H-shape cross section.

In the above holder 13 are bored cut grooves 15a, 15b on the side of front parallel walls 14, respectively, and the above leaf spring 10 is inserted and secured into and to the cut grooves 15a, 15b so as to uniformly extend the leaf spring 10 from the holder 13.

After fixing the leaf spring 10 to the holder 13, leaf spring portions 10a, 10b between the parallel walls 14 of the holder 13 are cut off, and pads 16a, 16b are adhered to the pad adhering portion 11 of the leaf spring 10 thereby to form the pad device.

The pad device thus constructed is held within a lower casing 17 of the cassette by means of the holder 13 which has inserted between its legs a pair of tape stopper ribs 19a, 19b located close to a boss 18 for securing screws of upper and lower casings and a capstan shaft inserting hole 2 provided in the lower casing 17 of the cassette casing.

The pad device held within the above lower casing 17 is separated from tape guide pins 20a, 20d at both ends of the leaf spring 10 as shown in FIG. 4.

The tape cassette thus assembled with the pad device does not require the leaf spring to be bent even during assembly, so that there is no unevenness or scattering of spring pressure caused by a bending error, and a uniform contact pressure can be obtained. As a result, excellent recording and reproducing can be obtained. Further, even when contacting a magnetic head with two pads at the same time, there is no deleterious influence upon the other pad.

Further, when assembling the pad device within the cassette, the holder is only inserted between the boss and the rib of the lower casing, so that its handling is simple without damaging a tape when inserting the tape.

Edges of the front parallel walls of the above holder also serve as a tape guide, so that there is not required any special tape guide and its construction becomes simple.

The present invention is not limited to the above embodiment, but can be modified in such a manner that separately molded leaf springs can be inserted in the holder from both sides thereof.

As described in detail in the preceding, the present invention can provide a pad device for use in a tape cassette having a certain pad pressure, which can perform excellent recording and reproducing, is easy in assembling and construction and cheap in cost.

What is claimed is:

1. In a tape cassette having a cassette casing with magnetic tape therein, a capstan shaft hole provided in said casing, magnetic head insertion windows provided at least on both sides of said capstan shaft hole and tape pad means including tape pad members located to urge said magnetic tape against magnetic heads inserted in said insertion windows, the improvement comprising a tape pad support assembly consisting essentially of a support member including a pair of legs juxtaposed on opposite sides of said capstan shaft hole and arranged to receive a capstan shaft therebetween, a pair of separated independent spring members each mounted, respectively, in one of said legs to extend in opposed directions over said insertion windows having said tape pad members mounted thereon, and means operatively supporting said support member in said cassette with said tape pads adjacent said insertion windows.

2. The improvement according to claim 1 wherein said support member has a generally H-shape.

3. The improvement according to claim 1 wherein said separated independent spring members have the same length.

4. The improvement according to claim 1 wherein said support member is made of synthetic resin.

5. A method for manufacturing a tape pad support assembly for a tape cassette comprising the steps of providing a plastic support member having a pair of generally parallel support legs spaced apart to receive therebetween a capstan shaft of a tape recorder, cutting a support slot in each of said support legs, mounting upon said support member an integrally formed spring member by inserting said spring member to extend through both of said support slots, said spring member having a portion extending across the spacing between said legs and portions extending to opposite sides of said support member, cutting said spring member to eliminate therefrom said portion extending between said legs to form said spring member into two separate parts supported in said support slots respectively, and attaching tape pad members to each of said two separate parts.

* * * * *